Dec. 27, 1966  J. TURCO  3,294,071
INTERNAL COMBUSTION ROTARY PISTON ENGINE
Filed Feb. 21, 1964  2 Sheets-Sheet 1

INVENTOR
Jérôme Turco

Dec. 27, 1966  J. TURCO  3,294,071
INTERNAL COMBUSTION ROTARY PISTON ENGINE
Filed Feb. 21, 1964  2 Sheets-Sheet 2

INVENTOR
Jérôme Turco

United States Patent Office 3,294,071
Patented Dec. 27, 1966

3,294,071
INTERNAL COMBUSTION ROTARY PISTON
ENGINE
Jérôme Turco, 2111 Girouard St., Montreal 28,
Quebec, Canada
Filed Feb. 21, 1964, Ser. No. 347,333
6 Claims. (Cl. 123—11)

From a technical point of view, internal combustion engines with several cylinders have many disadvantages, such as weight, volume, excessive number of parts and accessories, along with valuable waste of energy, because of an ineffective system of exploiting the energy of heat work due to the dead centre position in the back and forth motions of ordinary piston engines.

Several attempts were made to create profitable rotary or semi-rotary engines in circular toroidal or elliptical shapes. The complicated articulations involved in the rotary engines, together with defective compression difficulties in cooling and inadequate oiling systems, make these engines impractical.

The object of the present invention is a new designed internal combustion rotary piston engine which remedies all the above-mentioned disadvantages.

This engine comprises a perfectly spherical chamber, made up of two half spherical casings. In the center of each half sphere, bearings are placed. Four apertures, disposed in two diametricaly opposed groups and at different degrees level, are placed on the circumference of the casing. Two pairs of rotary pistons rotate inside this chamber. The two pairs of rotary pistons are connected two by two and are diametrically opposed to each other about a semi-shaft. Each semi-shaft is independent and is extended through the bearings of the spherical chamber. The two shafts are then connected to a single shaft by means of a differential.

The engine works in the following manner:

Let us clamp a pair of rotary pistons in position between four casing apertures. Moreover, let us consider one aperture as being the entrance of the fuel and air mixture, the other closest aperture being the exhaust and the two opposed apertures being closed. Thus, if the other pair of rotary pistons are rotated clockwise, obviously four chambers are formed, making up the four phases of a cycle: admission, compression, work and exhaust. Therefore, towards the end course of the second pair of rotary pistons, the compression phase occurs between a moving rotary piston and a stopped rotary piston. Hence, according to the law of direct central hit caused by two equal elastic masses moving in the same direction, they interchange their speed. The moving pair of rotary pistons take the place of the stopped piston, and the stopped piston is pushed away in a clockwise direction. At this point of the cycle, ignition takes place; power, exhaust, admission, compression and the cycle starts over again.

Of course, an engine similar to the one described cannot yield the expected results, and this for several reasons. First of all, it is necessary to have high compression without any leaks of gas whatsoever. Therefore, several compression rings are placed on the rotary pistons; but a problem arises, namely: the shafts prevent a circular machining of the rotary pistons. Accordingly, I found out that in order to be able to trace the grooves on the circumference of each pair of rotary pistons, the two pairs of rotary pistons must be each fixed to a tubular shaft. Said tubular shaft is fixed between a pair of rotary pistons, beginning at the centre and ending at the common centre circumference of the two rotary pistons. The two tubular shafts are then extended and pinned on two other independent and concentric shafts passing through said bearings of each half sphere casing.

Secondly, if effective results are desired, together with auto-combustion of the fuel, as in a diesel engine, the volume of the compression chamber must be reduced to a maximum. I have found out that in this particular type of rotary piston engine, the surface of each piston must meet parallel with the surface of another piston. In conclusion, all surfaces of the rotary pistons must pass by their common central line.

Thirdly, the machining of the spherical casing must have its centre out-centred a few thousandths of an inch towards the hot chamber so that, when the engine has reached its normal working temperature, the pistons will be rotating in a circular sphere in spite of the expansion of the casing caused by the heat of the combustion chamber.

Fourthly, to improve the functioning of this engine, it is necessary that the pair of pistons rotate in one and the same direction. To achieve this feature, I connect each pair of pistons to a light drum placed at the exterior of the sphere, and these drums are connected each to one of the said two tubular shafts. In addition, a pair of eccentric brakes are applied on each drum and on the surface of the brakes there is a layer of anti-friction material (Babbit) which is constantly lubricated by the engine oiling system. On the external part of the brakes, the off-centered part is in contact with rollers, and these rollers are in contact wtih another eccentric part held steady. This system allows rotation in only one way; in the opposite direction, the mobile eccentric carried along by the drum clamps the drum instantaneously.

Fifthly, when a pair of rotary pistons act as the compression head, it is necessary to clamp the drums alternately both ways, in order to assure the four phases of the engine. I found out that to clamp the drums both ways, appropriate cams must be placed on each drum to control a lever system acting on the eccentric clamping system. Also, a piston and cylinder similar to already existing hydraulic wheel brakes of conventional automobiles, can be incorporated. Pressure is being supplied by the pneumatic pressure of the engine or by oil pressure from the engine lubricating pump, or a combination of the three devices.

Sixthly, the compression ratio of the engine depends on the resistance of the clamping system and the clamping resistance depends on the pressure applied onto the drums. I found out that pneumatic or hydraulic pressure must be controlled by a pressure regulator, which is controlled exteriorly. This will allow a change in the compression ratio of the engine even while it works. Of course, this pressure is applied only for a fraction of the cycle; therefore, this pressure must be put on and off rapidly. I have discovered a way of distributing the pressure in using a slide valve with openings, whereby the cams control the slide valve which yields passage of the pressure to the drums. Then, when the slide valve is freed from the cam, it comes back to its central position; and, when in said position, the whole braking system is on discharge and the drums rotate freely. If the engine has sufficient electrical energy available, a still more efficient clamping frictionless system can be provided by using powerful electro-magnet, also controlled by cams.

Seventhly, the engine as described above gives an alternating motion, which cannot be used to produce a smooth steady rotary motion. On the other hand, it is necessary for the engine that the rotary motion be converted back into alternating motion, in order to be able to start up the engine and ensure the start and stop of each pair of rotary pistons. I found out that the two concentric shafts must be extended to the inside of a differential casing of a conventional automobile, its function being to unite the two shafts into a single shaft and, at the same time, to let each shaft rotate independently at different speeds. Each shaft is connected to a planetary gear; each planetary gear transmits alternating motion to the satellite gear. The satellite gear rotates around the planetary gear clamped by the drum and, at the same time, actuates the casing with a constant rotational motion. A flywheel regulates the rotation of the differential casing and the transmission. It often happens that for any given power output, the engine is not suitable for the required speed of the transmission. Therefore, I have discovered that, to remedy this inconvenience, all there is to do is to increase or decrease the diameter of the planetary gear to the diameter of the satellite gear, so that the speed will be modified between the engine and the transmission.

Eightly, to prevent the two pairs of rotary pistons from hitting each other, I found out that two elastic blades held on the planetary gear having an angular course slightly smaller than the piston, will prevent any hitting, if stopping on a fixed point of the casing.

It is a known fact that diesel engines use fuel oil which is introduced by injection at the end of the compression stroke. It is, therefore, impossible to introduce it in its admission stroke because it infiltrates into the pan and in the lubricating oil. Moreover, it produces violent combustion, which is dangerous when pistons of reciprocal engines are at their upward dead centre. On the contrary, a spherical rotary piston engine can take air and fuel mixture at the admission, because there is no pan; so fuel introduced at the admission at low temperature does a considerable lubricating job on the rings, and, since this engine has no dead centre, a violent combustion always takes place on the maximum lever arm of the piston.

Furthermore, this engine works on partial power; that is, it works with both air and fuel mixture reduced. Since the compression chamber is variable, the compression temperature is constant and, therefore, the ignition will be constant and the fuel feeding can be done directly by a single carburetor or an injector installed on the admission of said engine.

The spherical casing is water cooled and the pistons are cooled by oil pressure. This oil pressure also actuates the clamping of the drums. A by-pass on the oil circuit regulates the pressure and the surplus goes through the inside of the shafts, pistons and differential so that all moving parts are lubricated with the same oiling system.

Finally, I have discovered that this principle could be used as a double action air compressor, this being done by leaving the four apertures open on the sphere and having the transmission shaft rotated by some external means.

It is understood that the different shapes which can be taken by the constituting parts of this engine, their dimensions, details, their attachments and the matter used with their dimensions, can vary without hindering the principle of the invention.

The foregoing and other objects of the present invention will become more apparent during the description and by referring to the drawings, in which.

In the drawings, like reference characters indicate like elements throughout.

Figure 1:
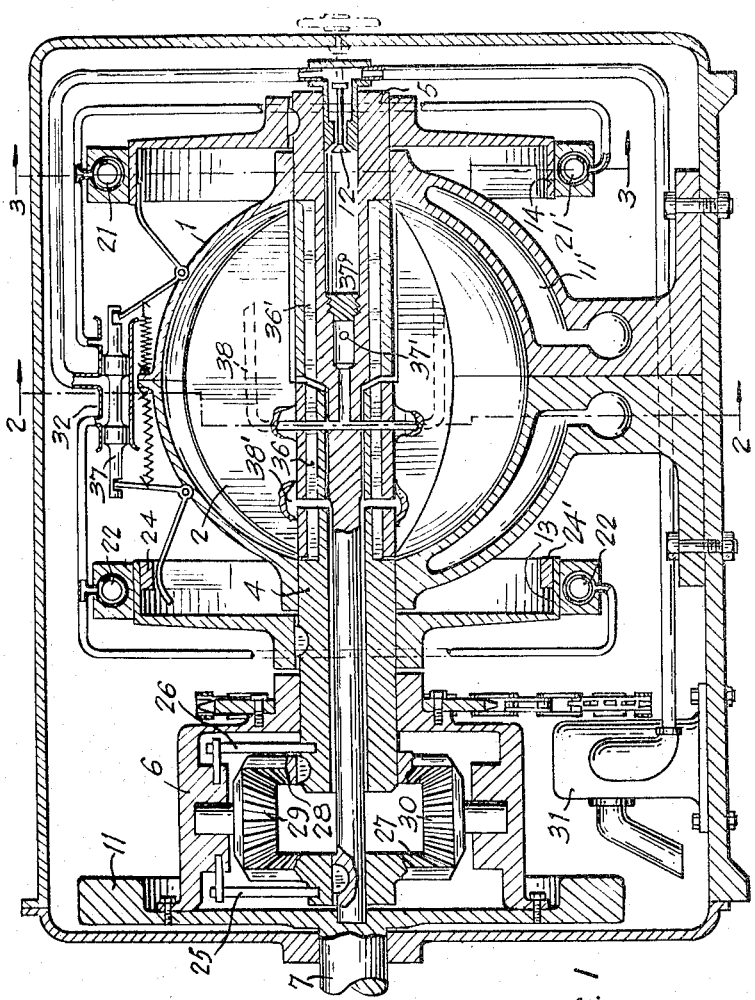
FIGURE 1 represents a full longitudinal section, taken on line 1—1 of FIG. 2 of the engine, including the spherical casing, a pair of pistons, the shafts, the two drums, differential, flywheel, oil pump, slide valve and the clamping system.
Figure 4:
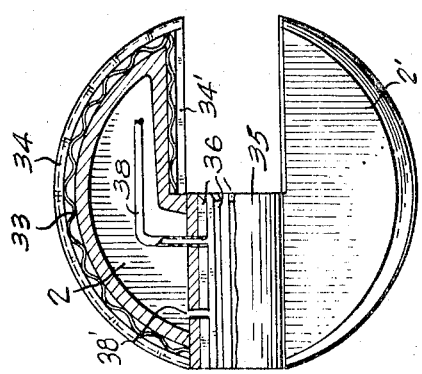
FIGURE 4 represents a pair of pistons connected to a tubular half shaft, being a section taken along line 4—4 of FIG. 2.
Figure 2:
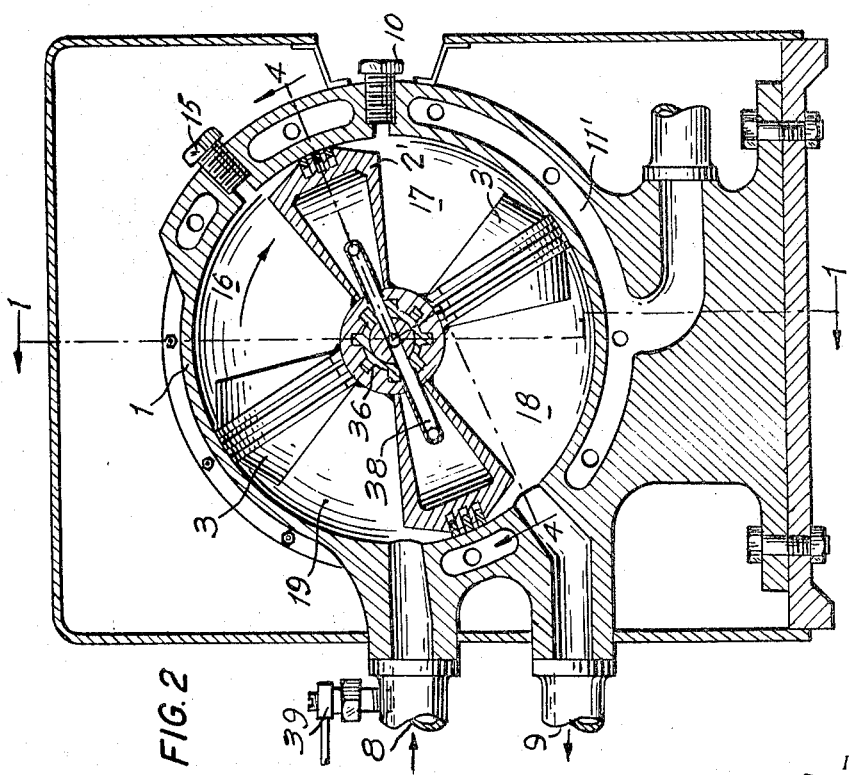
FIGURE 2 represents a cross-section, taken on line 2—2 of FIG. 1, showing the spherical casing with the two pairs of rotary pistons and apertures.

This engine is made up of a spherical casing 1, having an exhaust port 9 and an air inlet port 8. A fuel injector 39 is placed on the air inlet port. The injector receives pressurized fuel which comes from any diesel fuel pump (not shown on drawings). Other openings for other uses, which are shown blocked in the drawings, are placed on casing 1. At the interior of casing 1, there are two pairs of concentric pistons 2, 2', 3, 3', having their lateral surfaces converging and passing through their common axis of rotation. The pair of pistons 2, 2' (FIGS. 4 and 1) are secured to a hub which is keyed to shaft 4 by flutes 36. Said shaft 4 is fastened onto drum 13 and to planetary gear 28. The pair of pistons 3, 3' (FIG. 2) are fastened to a hub keyed to shaft 5 by flutes 36' (FIGS. 1 and 2). Shaft 5 is fastened to drum 14; it passes inside tubular shaft 4; and it is then clamped to planetary gear 27. The two gears are related with blades 25 and 26 and to satellite gears 29 and 30. The satellites rotate with casing 6, flywheel 11 and transmission shaft 7.

Figure 3:
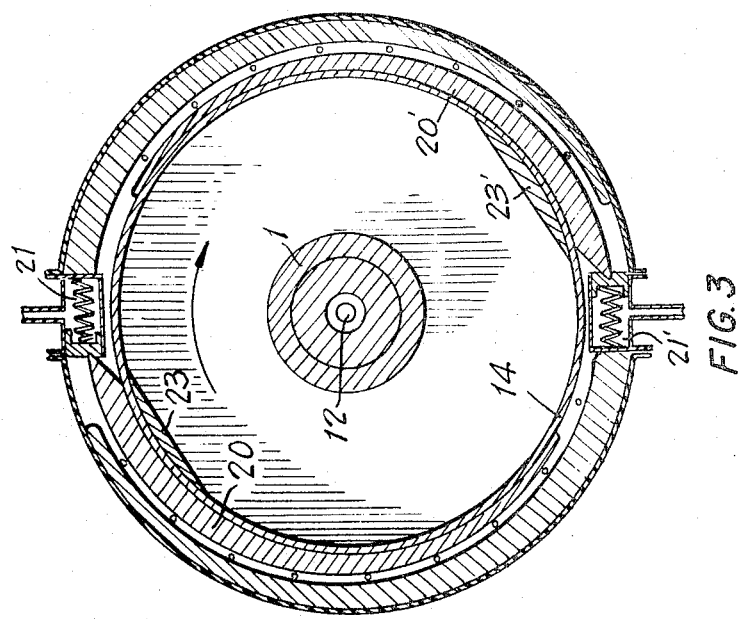
FIGURE 3 represents a cross section, taken on line 3—3 of FIGURE 1, showing one of the drums with its clamping system.

The hydraulic system includes oil pump 31, variable adjustable pressure by-pass 12, cylinder 32 and slide valve 37, cams 24, 24' and 23, 23' (FIG. 3), drums 13 and 14, cylinders 21, 21'. The pistons of these cylinders act upon eccentric wedge-shaped brake shoes 20, 20'. The external parts of these eccentric wedge-shaped brake shoes are in contact with roller bearings and these roller bearings are in turn in contact with fixed eccentric 40 (FIG. 3). The internal parts of these brakes have a layer of antifriction metal (Babbit) and this part is in contact with drum 14. The assembly is partially immersed in oil of the pan. The drum 14 rotates freely in a clockwise direction; in the opposite direction, the friction of the drum 14 carries along the eccentric on the roller bearings, causing an instantaneous clamping.

The clamping system with electro-magnet, as well as the mechanical system with levers and pneumatic, do not appear on the drawings.

The engine functions in the following manner:

For instance, if the engine rotates in clockwise direction (FIG. 2) and the pair of pistons 2, 2' are clamped by the braking system exactly between admission port 8 and exhaust port 9, the pair of pistons 3, 3' are actuated by the flywheel 11, which is secured to casing 6. Satellites 29, 30 and planetary gear 28 transmit the motion to pistons 3,3' in a clockwise direction. Accordingly, the pair of pistons 3,3' accomplish four phases simultaneously: admission of air in chamber 19 and of fuel coming from aperture 8 and injector 39, compression in chamber 16, power in chamber 17, and exhaust in chamber 18. At the end of these four simultaneous phases, the compression increases and the temperature of air and fuel increases following Charles law, up until auto-ignition takes place. The pressure increases four times greater; piston 3 has a tendency to change its direction, but its inertia helped by the no-come-back of drum 14 forces it to stop. In the meantime, clamped drum 13 does not resist any more to the impact of piston 2; it slips and frees cam 24 of slide valve 37. Slide valve 37, carried along by a spring action, moves in the middle and puts the circuit into discharging position, so the pair of pistons 2,2' are fixed and produce again four phases simultaneously. After half the course, an equilibrium of pressure is produced between the four pistons, at equal forces. The differential 6 carries along the four pistons in the same direction. When the pair of pistons 3, 3' pass between admission 8 and exhaust 9, it clamps itself because of back pressure to the opposed piston and because drum 14 engages cam 23 which controls slide valve 37 to its own clamping; therefore, the cycle starts over again. The pistons are libricated by the fuel at the admission and by the lubricating oil which crosses the passage between 37' and 38.

Finally, if we leave the four apertures 8, 9, 10, 15 open and if the engine is rotated by transmission 7, this engine becomes a double action air compressor.

To improve the engine efficiency, the spacing between admission port 8 and exhaust port 9 can be increased to twice of that shown. Opening 15 will be opposite combustion chamber 16 and can be fitted with a spark plug, a fuel injector, or a glow plug.

What I claim is:

1. An internal combustion spherical engine with rotary pistons, including a casing having a spherical chamber therein, said casing being formed of two parts each having a half sphere, the axis of said chamber passing through the center thereof and being normal to the plane of intersection of said two casing parts, bearings placed in the center of each casing part and aligned with said axis, each casing part having two apertures, each aperture in one casing part being diametrically opposed to an aperture in the other casing part, two pairs of pistons disposed in said chamber for rotation about said axis with each piston of one pair being intermediate the other pair of pistons, two coaxial shafts extending along said axis into said chamber, one pair of pistons being connected to one of said shafts and the other pair of pistons being connected to the other of said shafts, said shafts extending out of said chamber with one shaft connected to one gear of a differential and the other shaft connected to the opposite gear of said differential, a flywheel and a transmission shaft being connected to the housing of said differential, the edge of said pistons conforming to the spherical chamber and the piston surfaces intermediate said edge and said axis is radially disposed, two drums, one fixed to each of said shafts, two hydraulic brakes, one acting on each drum to brake said drum when hydraulic pressure is applied to the brake, and cams carried by said drums to coact with a slide valve to actuate one or the other of said brakes to prevent rotation of the drum and its shaft and pair of pistons.

2. An internal combustion spherical engine as claimed in claim 1, wherein each hydraulic brake includes wedge-shaped brake shoes surrounding said drum, stationary excentric members surrounding said brake shoes, means to cause free movement of said brake shoes relative to said excentric members, hydraulic cylinder and piston units engageable with said brake shoes to cause said brake shoes upon actuation of said units by hydraulic fluid pressure to block said drum against rotation in both directions of rotation, said units, upon deactuation, allowing said brake shoes to permit rotation of said drum in one direction, but said brake shoes preventing rotation of said drum in the opposite direction below a predetermined torque imparted to said drum, but allowing rotation of said drum in said opposite direction upon said predetermined torque or a higher torque being imparted to said drum.

3. An internal combustion spherical engine as claimed in claim 2, wherein said brake shoes have an internal lining of Babbitt metal.

4. An internal combustion spherical engine as claimed in claim 2, wherein said means to allow free movement of said brake shoes relative to said eccentric members, include roller bearings between said eccentric members and said brake shoes.

5. An internal combustion spherical engine as claimed in claim 2, wherein said slide valve includes spring means urging the same to take a position deactuating said cylinder and piston units upon said cam ceasing to act upon said slide valve.

6. An internal combustion spherical engine as claimed in claim 5, further including valve means to throttle the fluid pressure admitted to said cylinder and piston units to vary the braking action of siad brake shoes, to thereby adjust the compression ratio of said engine.

References Cited by the Examiner

UNITED STATES PATENTS

| 987,929 | 3/1911 | Thomas | 123—11 |
| 1,485,591 | 3/1924 | Bullington | 123—11 |
| 1,739,104 | 12/1929 | Tropp | 123—11 |
| 2,126,795 | 8/1938 | McIntyre | 123—11 |
| 2,142,706 | 1/1939 | Wolstenholme | 123—11 |

FOREIGN PATENTS

| 211,801 | 2/1924 | Great Britain. |
| 450,230 | 7/1949 | Italy. |

MARK NEWMAN, *Primary Examiner.*

F. T. SADLER, *Assistant Examiner.*